Feb. 1, 1966
N. BERAR, JR., ETAL
3,231,963
BALL JOINT SUSPENSION
Filed June 15, 1960
2 Sheets-Sheet 1
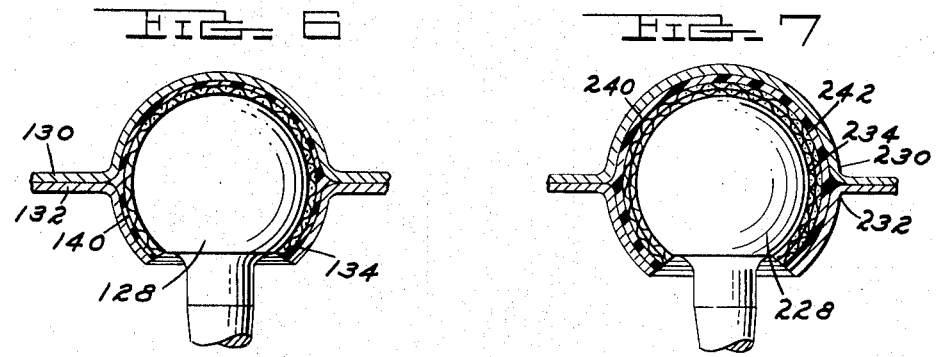
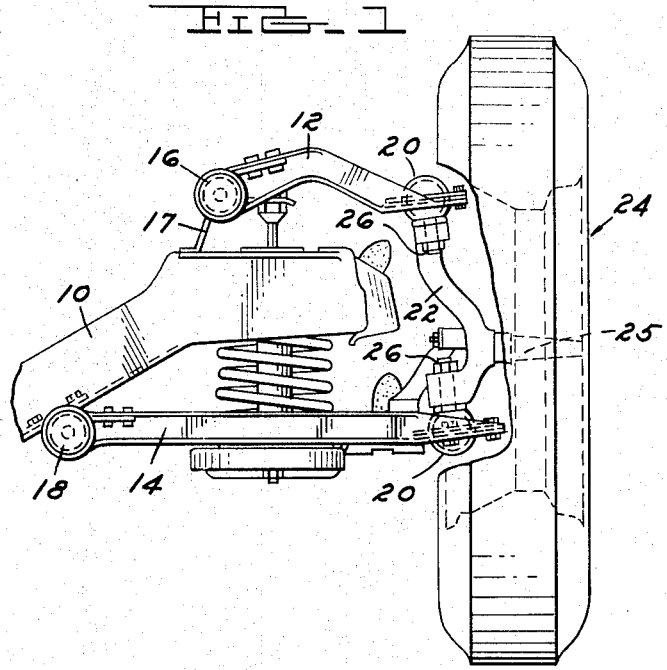
RALPH P. SCHMUCKAL
THOMAS H. RISK
NICHOLAS BERAR, JR.
JOHN L. CHAIVRE
INVENTORS
BY John R. Faulkner
Clifford L. Sadler
ATTORNEYS

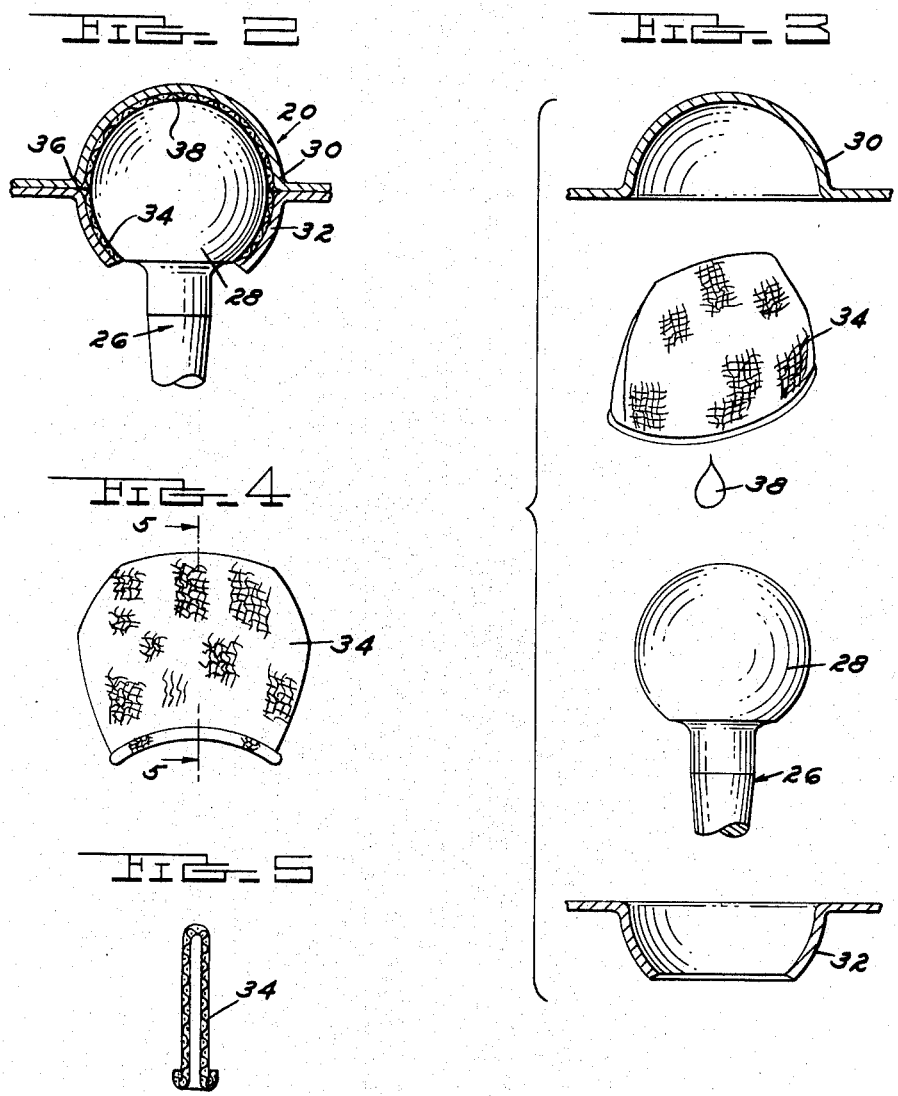

United States Patent Office 3,231,963
Patented Feb. 1, 1966

3,231,963
BALL JOINT SUSPENSION
Nicholas Berar, Jr., East Detroit, John L. Chaivre, Detroit, and Thomas H. Risk and Ralph P. Schmuckal, Birmingham, Mich., assignors to Ford Motor Company, Dearborn, Mich., a corporation of Delaware
Filed June 15, 1960, Ser. No. 36,431
8 Claims. (Cl. 29—149.5)

The present invention relates to ball and socket joints and more particularly to the construction of ball joints such as are used in automotive suspension and steering systems.

In the present state of the automotive art it is common practice to provide ball and socket type joints for connecting the outer ends of the upper and lower support arms of an independent front suspension to the upper and lower ends of the wheel spindle and at the inner and outer ends of the steering tie rods. These ball joints have been constructed by a great variety of methods including processes employing moldable synthetic resins.

The present invention constitutes an improvement in the manufacture of ball and socket joints where synthetic resinous materials are used. More particularly, the invention provides a sock-like piece knitted from low friction plastic fibers, such as fiberous linear polyethylene or tetrafluoroethylene as the bearing surface in contact with the ball.

In one of the embodiments of the invention the knitted sock is fitted over the spherical end of a stud or ball portion of a joint. This assembly is then held in a metallic socket by any one of several backup methods, such as by injecting a moldable plastic material between the outer surface of the plastic coated sock and the inner surface of the socket. Alternate methods of holding the sock in place include mechanically pinching a portion of the sock between the members which make up the socket portion of the joint. Thus held in place, the sock serves as a low friction liner for the socket.

Regardless of the particular method employed to position the bearing assembly, it is retained firmly against the ball to provide an initial friction loading of the joints and to obtain the proximity desired for satisfactory operation.

Therefore, it is an object of the present invention to provide a ball joint assembly adaptable to automobile suspension systems and other uses that require a joint characterized by its simplicity and economy of manufacture.

It is a further object of the present invention to provide a ball and socket type joint assembly having a knitted plastic sock-like member which forms a low friction surface for the socket in sliding contact with the ball portion of the joint.

It is still another object to provide in such a joint having a low friction knitted liner a means for preloading the joint by securing or pressing the liner tightly against the ball.

These and further objects of the present invention will become apparent from the following description and the accompanying drawings, in which:

FIGURE 1 is a front elevational view of an automotive front suspension incorporating a ball joint constructed in accordance with the present invention;

FIGURE 2 is an elevational view partly in section of the ball joint used in FIGURE 1;

FIGURE 3 is an exploded view of the components used to form the joint of FIGURE 2;

FIGURE 4 is a side elevational view of the low friction liner used in the joint of FIGURE 2;

FIGURE 5 is a sectional view taken along section lines 5—5 of FIGURE 4;

FIGURE 6 is an elevational view partly in section of a modification of the joint of FIGURE 2; and FIGURE 7 is an elevational view partly in section of another modification of the ball joint of FIGURE 2.

Referring now to the drawings for a more detailed description of this invention wherein like reference numerals throughout the various views identify like parts, FIGURE 1 shows a portion of an automotive vehicle independent front suspension system which includes a frame or structural member 10 that pivotally supports upper and lower wheel support arms 12 and 14, respectively.

The inner end of upper arm 12 is pin mounted at 16 to a bracket 17 carried by the frame member 10. The inner end of the lower support arm 14 is pin mounted at 18 to another portion of frame member 10. The outer ends of the arms 12, 14 are provided with ball joints 20 which are connected to a steerable wheel spindle 22. The spindle 22 rotatably carries a wheel and tire assembly 24 on a stub axle 25.

The upper and lower ball joints 20 are identical and permit universal movement between the spindle 22 and the arms 12 and 14 as required for steering the wheel 24 or for jounce and rebound deflections induced by road conditions.

As seen in FIGURES 2 and 3 the ball joint 20 is comprised of a stud member 26 having a ball or spherical head 28, upper and lower socket members 30 and 32, and a low friction liner which slidably receives the ball 28.

In the present invention, the low friction liner is fabricated from a low friction synthetic resinous material which may, for example, be tetrafluoroethylene. To form the liner it is fabricated as a sock 34 by knitting fibers of the low friction plastic. In FIGURES 4 and 5 the sock 34 as originally knitted is flat in cross section and somewhat circular in elevation. Being knitted, it is stretchable and can therefore be made slightly undersize so that when it is fitted over the ball 28 it will stretch to hug the ball 28 tightly.

In the form of invention in FIGURE 2, the hemispherical members 30 and 32 are accurately machined or coined to size to match the ball 28. In turn, the ball 28 is honed and chromium plated for exactness. The clearance between the ball 28 and the socket members 30, 32 is designed to be nominal so that when the sock 34 is fitted over the ball 28, and the members 30, 32 close about it, the sock 34 will be held tightly against the ball 28. In addition, the sock 34 is pinched between the members 30, 32 at their circumferential juncture 36. This pinching forms a positive mechanical locking of the low friction liner 34 relative to the socket parts 30, 32. Thus sliding movement will occur between the ball 28 and sock 34 rather than between the sock 34 and socket 30, 32.

Where a low friction plastic material such as tetrafluoroethylene or linear polyethylene is used for the sock 34 and it is held tightly against the ball 28, the sliding friction is proportional to the velocity and frequency of movement between the ball surface and the liner surface. As the velocity or frequency of relative movement increases the friction will also increase. This characteristic is sometimes referred to as viscose dampening. Such a quality in a ball joint suspension system for automobiles is highly desirable as it reduces wheel fight at high speed.

Because low friction plastic materials are relatively expensive, the sock liner 34 is knitted from strands or threads. By knitting the liner, maximum efficient use is made of the plastic. When the sock 34 is knitted to shape, there is no excess material or scrappage as compared with other methods of fabrication of a liner, such as forming flat pieces of cloth by pulling to shape over a die.

By using a metal socket 30, 32 and a ball 28 which are machined accurately to size, the nominal clearance between the two components can be held to a close tolerance and the plastic sock 34 will be held tightly against the surface of the ball 28. In this fashion an initial friction load is imposed in the joint 20. This load helps dampen shimmy and wheel vibrations which might result from a sloppy joint. Further, the thread or filaments of plastic which normally have a circular cross section in their free state assume an oval shape when pressed against the ball.

An improvement of the joint 20 disclosed in FIGURE 2 includes the incorporation of a lubricant as indicated in FIGURE 3 by the droplet 38. Tests have indicated that a grease-like lubricant made with bits or linters of linear polyethylene suspended in a heavy oil will reduce friction by about 50% compared with the usual chassis lubricant.

A modification of the present invention is disclosed in FIGURE 6, where a low friction sock 134 of plastic material is knitted and placed over the ball 128. Sock 134 of FIGURE 6 is similar to sock 34 of FIGURES 2–5. It is knitted of such size that it will fit snugly over the ball 128. The upper and lower half shells 130, 132 which form the socket are closed about the sock covered ball 128. In this modification the clearance between the ball 128 and the socket parts 130 and 132 is significantly greater than the nominal clearance required to pinch the sock 34 as in FIGURE 2.

After socket parts 130, 132 are closed, a plastic material is injected through an opening (not shown) into the clearance space to form a backup layer 140. The backup layer 140 holds the sock 134 in place and carries the load of the joint. Normally, the operating temperatures of a ball joint are within a reasonable range so that the plastic backup material 140 may be formed of a thermoplastic by injection molding methods which are well known. However, if the joint is to be used in an application other than a vehicle suspension system or where heat is a problem, then the backup layer 140 may be formed by a molding or casting method using thermosetting plastic.

The material for the layer 140 is selected from that group of plastic which will shrink upon molding. This shrinking characteristic will cause the joint to be preloaded with the same desirable results discussed above in connection with the device of FIGURE 2. For example, the backup layer 140 may be a casting resin such as epoxy or molded of nylon reinforced with fiberglass.

When the sock 134 is knitted of a low friction plastic such as tetrafluoroethylene, difficulties may be encountered in injecting the backup material of layer 140 directly against the sock fabric. The backup material may not have an affinity for adhering itself to the plastic used in the sock 134.

For insuring the adhesion of the backup or cushion layer 140 to the sock 134, the sock 134 is knitted from a combination of materials such as threads or strands of a low friction polyethylene and cotton. This arrangement has the advantage that the sock may be pulled over the ball 128, placed between the socket parts 130, 132 and when the backup layer 140 is injected, the plastic of that layer will adhere to the cotton strands which form a part of the sock 134.

A combination cotton and plastic sock also has the further advantage that when it is placed over the ball 128 it can be steam treated so that the cotton will shrink to pull the sock 134 tightly about the ball 128. Other materials than cotton may be used advantageously for this particular feature. For example, the shrinkable fibers may be formed of either wool or Orlon. Orlon is the trademark of E.I. du Pont de Nemours and Company for its acrylic fibers. In the case of a composite sock which is formed in part of Orlon, the sock must be chemically treated rather than steam treated to achieve the shrink-fit.

With the arrangement of FIGURE 6 the dimensions of the socket parts 130, 132 need not be held to close tolerance as the actual socket surface which complements the exterior of the ball 128 is molded to size. However, the ball 128 must be accurately machined, honed for roundness and chromium plated to have the smoothest possible surface. An economical alternative to this expensive processing is to provide a plastic-coated metal ball. The ball is formed by forging or upsetting to size and then a thermoplastic coat is accurately molded about the ball. Balls manufactured by this method with approximately .060 inch thick plastic surfaces have worked successfully.

An alternate concept of the present invention is illustrated in FIGURE 7. The joint illustrated there provides a plurality of socks. The inner liner sock 234 is formed of a low friction material in a manner similar to socks 34 and 134 already discussed. A second and outer sock 242 is formed by knitting cotton fibers.

In this construction of the ball joint, the knitted low friction plastic sock 234 is fabricated and then placed snugly over the ball 228. The cotton sock 242 which is knitted in a fashion similar to sock 34 is pulled over the inner sock 234.

This assembly of ball 228 and socks 234, 242 is then inserted between the socket parts 232 and 230. A backup material layer 240 is next injection molded into the clearance space between the outer cotton sock 242 and the socket pieces 230, 232. In this case, the cotton sock 242 serves to assist in holding the plastic sock 234 to the backup layer 240.

The present invention also includes a modification for the manufacture of the ball joint of FIGURE 7. In this modification the sock 234 is placed on the ball 228. Then a plurality of resin impregnated cotton socks are slipped over low friction sock 234. The resin in this case would preferably be a thermosetting one, such as epoxy. The socket parts 230, 232 are next closed about the covered ball 228, bolted or clamped tightly together and the assembled joint placed in an oven for curing. The pressure created by bolting or clamping assists in assuring a strong dense backup layer when cured. The backup layer in this instance consists of cotton reinforced resin rather than pure resin.

In accordance with the present invention a superior ball joint is provided which may be manufactured by inexpensive and simplified methods.

Further improvements may occur to those skilled in the art which will come within the scope and spirit of the appended claims. Where particular materials have been suggested, such has been done for purposes of illustration and not limitation. Obviously, equivalents may be substituted for the satisfactory practice of this invention.

We claim:

1. The method of making a joint having ball and socket parts comprising knitting a bearing member of low friction plastic material in the form of a sock to fit about said ball, positioning said sock about said ball, and forming said socket about said sock.

2. The method of making a joint having ball and socket parts comprising knitting a stretchable bearing member of low friction plastic material in the form of a sock to fit about said ball, stretching and positioning said sock smoothly and snugly about the surface of said ball, forming said socket about said sock.

3. The method of making a joint having ball and socket parts comprising the steps of knitting a socket liner in the form of a sock to fit about said ball, said liner being knitted from low friction plastic fibers and shrinkable fibers, positioning said sock about said ball, treating said sock so as to shrink said shrinkable fibers, forming the outer portion of a socket about said liner.

4. A method for making a joint having ball and socket parts comprising the steps of knitting a bearing liner of low friction plastic fabric in the form of a sock to fit about said ball, covering said fabric with a plurality of resin impregnated fabric layers, closing said socket parts about said layers, and curing said resin to form a rigid backup layer.

5. The method for making a joint of the ball and socket type comprising the steps of knitting a bearing liner of low friction plastic fabric in the form of a stretchable sock to fit about said ball, positioning said sock in shell-like socket parts and molding a plastic backup layer into the cavity between said parts and said sock.

6. A method for making a joint having ball and socket parts comprising the steps of knitting a bearing liner of low friction plastic fabric in the form of a stretchable sock to fit about said ball, stretching said sock to position it about the surface of said ball, covering said sock with a plurality of resin impregnated fabric socks, closing said socket parts about said socks, and curing said resin to form a rigid backup layer.

7. A method for making a joint having ball and socket parts comprising the steps of knitting a bearing liner of low friction plastic fabric in the form of a stretchable sock to fit about said ball, stretching said sock to position it about the surface of said ball, covering said sock with a plurality of resin impregnated fabric socks, closing said socket parts about said socks, and curing said resin to form a rigid backup layer.

8. The method of manufacturing a bearing liner to cover a spherical part comprising knitting said liner from low friction plastic fibers and in the form of a sock to fit said part snugly.

References Cited by the Examiner

UNITED STATES PATENTS

| | | | |
|---|---|---|---|
| 2,157,116 | 5/1939 | Carothers | 66—178 |
| 2,396,166 | 3/1946 | Faucette | 66—178 |
| 2,804,886 | 9/1957 | White. | |
| 2,838,436 | 6/1958 | Clingman. | |
| 2,905,492 | 9/1959 | Alexander | 287—87 |
| 2,944,831 | 7/1960 | Thomas | 287—90 |
| 2,974,975 | 3/1961 | Thomas. | |

FOREIGN PATENTS

| | | |
|---|---|---|
| 1,181,482 | 6/1959 | France. |
| 840,686 | 7/1960 | Great Britain. |

DON A. WAITE, *Primary Examiner.*

RICHARD A. DOUGLASS, FRANK SUSKO,
*Examiners.*